(12) United States Patent
McClard et al.

(10) Patent No.: US 10,598,811 B2
(45) Date of Patent: Mar. 24, 2020

(54) MAGNETIC IDENTIFICATION OF AN OBJECT

(71) Applicant: Intel Corporation, Santa Clara, CA (US)

(72) Inventors: Anne P. McClard, Portland, OR (US); Aaren B. Esplin, Portland, OR (US); James C. Farwell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 426 days.

(21) Appl. No.: 15/415,770

(22) Filed: Jan. 25, 2017

(65) Prior Publication Data
US 2018/0207518 A1    Jul. 26, 2018

(51) Int. Cl.
*G01V 3/38*    (2006.01)
*A63F 9/04*    (2006.01)
(Continued)

(52) U.S. Cl.
CPC ............ *G01V 3/38* (2013.01); *A63F 3/00643* (2013.01); *A63F 9/0468* (2013.01); *G01V 3/08* (2013.01); *A63F 2003/00668* (2013.01)

(58) Field of Classification Search
CPC .......... G01V 3/38; G01V 3/08; G07F 17/322; A63F 3/00643; A63F 9/0468; A63F 2003/00668

(Continued)

(56) References Cited

U.S. PATENT DOCUMENTS 2,185,556 A * 1/1940 Johnson .............. A63F 3/00088
                                                          273/246
3,359,003 A * 12/1967 Kass ................... A63F 3/00176
                                                          273/241
(Continued)

FOREIGN PATENT DOCUMENTS

WO      2006003366 A1    1/2006

OTHER PUBLICATIONS

Leclair, D., "DICE+ aims to drag the humble dice into the 21st century," published on internet Aug. 29, 2013, from URL <<http://newatlas.com/dice-plus/28830/>> [retrieved on Jan. 26, 2017] 5 pages.

*Primary Examiner* — John A Tweel, Jr.
(74) *Attorney, Agent, or Firm* — Schwabe, Williamson & Wyatt, P.C.

(57) ABSTRACT

The present disclosure relates to materials, devices, systems, and processes for magnetic identification of an object. Embodiments may include receiving from a plurality of sensors arranged within a layer of material an indication of a strength or signature of a magnetic field proximate to the corresponding sensor. The magnetic field may be created by the arrangement of one or more magnets proximate to a surface of the object where the surface is proximate to the plurality of sensors. Embodiments may include determining, based upon the indication of the strength or signature of the magnetic field proximate to the corresponding sensor, an arrangement of magnets proximate to the surface of the object. Based on the determined arrangement of the magnets
(Continued)

on the surface of the object, the process may include identifying the object or the surface of the object. Other embodiments may be described and/or claimed.

25 Claims, 5 Drawing Sheets

(51) Int. Cl.
*A63F 3/00* (2006.01)
*G01V 3/08* (2006.01)

(58) Field of Classification Search
USPC ........................................ 340/10.52
See application file for complete search history.

(56) References Cited

U.S. PATENT DOCUMENTS

| | | | | |
|---|---|---|---|---|
| 3,856,307 A * | 12/1974 | Tinman | ............... | A63F 3/00643 273/138.2 |
| 4,595,367 A * | 6/1986 | Forsyth | ............... | G09B 27/08 434/132 |
| 4,909,513 A * | 3/1990 | Kiyono | ............... | A63F 9/04 273/145 R |
| 5,031,913 A * | 7/1991 | Hirosumi | ............... | A63F 9/04 273/138.1 |
| 6,098,981 A * | 8/2000 | Schuetter | ............... | A63F 3/00634 273/243 |
| 7,350,781 B2 * | 4/2008 | Shalit | ............... | A63F 3/04 273/240 |
| 8,272,945 B2 * | 9/2012 | Kelly | ............... | A63F 3/00643 463/25 |
| 8,734,245 B2 * | 5/2014 | Kelly | ............... | A63F 3/00643 463/30 |
| 8,920,236 B2 * | 12/2014 | Kelly | ............... | A63F 3/00643 463/31 |
| 9,472,047 B2 * | 10/2016 | Hilbert | ............... | G07F 17/3211 |
| 9,613,487 B2 * | 4/2017 | Kelly | ............... | A63F 3/00643 |
| 2009/0051111 A1 * | 2/2009 | Andersen | ............... | A63F 3/00694 273/239 |

* cited by examiner

Non-transitory computer-readable storage medium 502,
as may be implemented in embodiments of FIG. 3.

Programming instructions 504
to cause a digital content consumption device, in response to execution of the instructions by a processor of the digital content consumption device, to practice aspects of embodiments of the processes of FIG. 4.

MAGNETIC IDENTIFICATION OF AN OBJECT

FIELD

Embodiments of the present disclosure generally relate to the field of object identification. More specifically, embodiments of the present disclosure relate to materials, devices and methods for using magnet configurations to identify an object and/or determine the position of the object relative to a sensing surface.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Identifying an object on a surface of the material, either by a identifying a location of the object on the surface and/or identifying a facet of the object that is tangent to the surface typically requires the object to be electrically powered. For example, a surface in the form of a child's play mat may include a plurality of radio frequency identification (RFID) antenna in the mat, which requires the object to be identified on the mat to be energized by the reader in order to send out signals to the plurality of antennas. In another example, the object to be identified on the mat may have an accelerometer within the object to identify the object orientation. The accelerometer within the object again requires the object to be powered. These examples present a challenge of keeping the object powered, either by replacing batteries or by recharging the object at regular intervals.

BRIEF DESCRIPTION OF THE DRAWINGS

These and other challenges may be overcome by embodiments described herein. Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
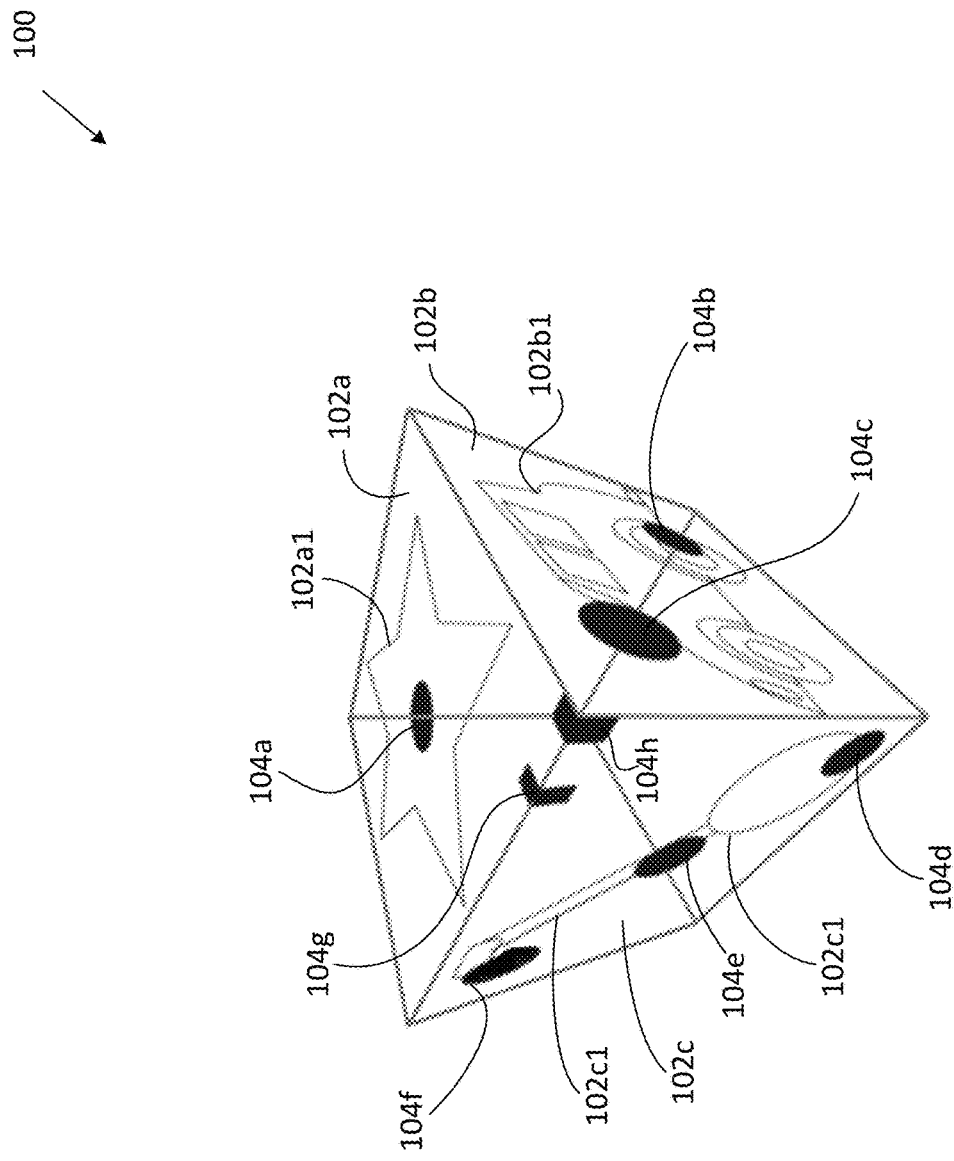
FIG. 1 is a diagram of a three-dimensional representation of an example object with magnet configurations, in accordance with various embodiments.

Apparatuses, processes, and systems for identification of an object are disclosed herein. In embodiments, a process for sensing an object may include receiving from a plurality of sensors arranged within a layer of material an indication of a strength or signature of a magnetic field proximate to the corresponding sensor. The magnetic field may be created by the arrangement of one or more magnets proximate to a surface of the object where the surface is proximate to the plurality of sensors. The process may include determining, based upon the indication of the strength or signature of the magnetic field proximate to the corresponding sensor, an arrangement of magnets proximate to the surface of the object. Based on the determined arrangement of the magnets on the surface of the object, the process may include identifying the object or the surface of the object.

In the following description, various aspects of the illustrative implementations are described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "including," "having," and the like, as used with respect to embodiments of the present disclosure, are synonymous.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled"

may mean two or more elements/devices cooperate and/or interact through one or more network linkages such as wired and/or wireless networks. By way of example and not limitation, a computing apparatus may include two or more computing devices "coupled" on a motherboard or by one or more network linkages.

Various operations are described as multiple discrete operations in turn, in a manner that is most helpful in understanding the claimed subject matter. However, the order of description should not be construed as to imply that these operations are necessarily order dependent.

FIG. 1 is a diagram of a three-dimensional representation of an example object with magnet configurations, in accordance with various embodiments. Diagram 100 shows an embodiment of an object in cube form having six facets 102a, 102b, 102c. Each of the facets may have one or more graphic elements on each facet 102a1, 102b1, 102c1 that may be used, for example, by a user to visually determine the orientation of the cube 100. The orientation of the object 100 may be important, for example, used for playing a game or tracking progress during a game played on a mat or other sensing surface. In embodiments, a facet of an object may also be referred to as a surface of the object.

In embodiments, one or more magnets 104a-104h may be placed at or near the facets 102a, 102b, 102c of the object 100. In embodiments, these magnets may be neodymium magnets. In embodiments, the magnets may have various shapes including but not limited to dots, circles, lines, squares, or an irregular shape. A first facet 102a may have a magnet in the center 104a of the facet and two magnets on the edge 104g, 104h of the facet. A second facet 102b may have two magnets near the center of the facet 104b, 104c. A third facet 102c may have three magnets in the interior of the facet 104d, 104e, 104f and two magnets on the edge 104g, 104h of the facet. Note that two magnets 104h, 104g are shared in common with two facets 102a, 102c.

In embodiments, the one or more magnets 104a-104h may also be part of the design of a facet. For example has shown, the center magnet 104a of the first facet 102a, the center two magnets 104b, 104c of the second facet 102b, and the center three magnets 104d, 104e, 104f may represents spots (pips) on facets of a die.

In embodiments, other object shapes (not shown) may have rounded facets, for example objects that may be spherical, nearly spherical, or egg-shaped. In non-limiting examples, objects may be irregularly shaped objects. Objects may be positioned, moved, and/or rolled onto a surface of a layer of material and may have one or more facets of the object proximate and/or adjacent to the surface of the layer of material. Various configurations of magnets configured on the one or more facets may be used to indicate the location of the object or of one or more facets of the object resting on the layer of material.

Figure 2:
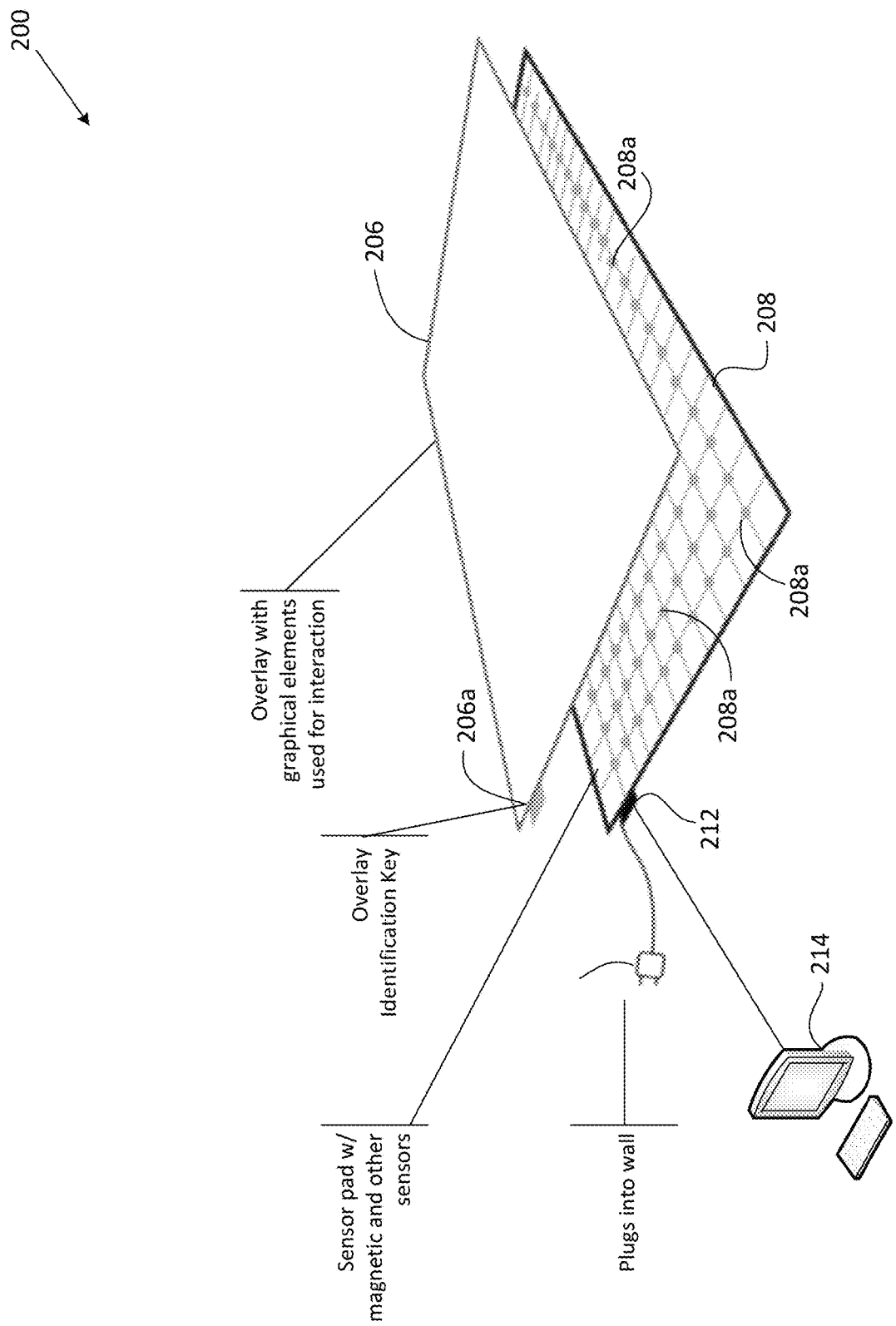
FIG. 2 is a diagram of an example sensing material that includes magnetic sensors to identify an object, in accordance with various embodiments.

FIG. 2 is a diagram of an example material that includes magnetic sensors to identify an object, in accordance with various embodiments. Diagram 200 shows an embodiment of a magnetic sensor mat that may include a layer of material 206 on which an object such as object 100 may be placed. In embodiments, the layer of material 206 may include graphical elements (not shown) that may be used by a user who interacting with the magnetic sensor mat 200 using the object 100.

In non-limiting examples, the layer of material 206 may have graphics that represent a path of a game by which the user may move the object 100 along the path, or may represent some other graphics such as the graphic of a board game. Another example may involve a game that includes a display (not shown) that may auditorily or visually present the user with an instruction to place a facet of the object 100 onto a specified location onto the layer of material 206. This may include an instruction such as "place the automobile face of the object onto the parking lot image on the mat." The user may then be informed if the instruction was correctly performed or not, and subsequent instructions may be given to the user. Another example may include the user rolling (throwing) the object onto the layer of material 206. The position and/or orientation of the object once it comes to rest upon the layer of material 206 may then be used to determine subsequent instructions to a user. Other examples may include multiple users using multiple objects 100 to interact with the layer of material 206, for example multiple users playing a board game. In embodiments, a system 214 may identify the block and the position of the block onto the magnetic sensor mat 200. This identified information may then be used to complete an interaction between the user and the system 214, as may be described below.

In embodiments, a layer of material 206 may be overlaid onto a sensor pad 208 having magnetic sensors 208a. In embodiments, the magnetic sensors 208a may be arranged in a grid pattern (as shown) or may be arranged in some other pattern. In non-limiting examples, this pattern may be a circular pattern, and offset pattern, or some other pattern. A magnetic sensor 208a may be able to detect the magnetic field, or detect a change in the magnetic field, created by the placement or by the movement of a magnet, such as a neodymium magnet, in proximity to the magnetic sensor 208a. In embodiments, sensors 208a may also include other sensors, such as pressure sensors, electric flux sensors, RFID sensors, and the like.

In embodiments, indications of each of a plurality of the magnetic sensors 208a may be received by the system 214. Based upon the values of the magnetic field reported by each of the plurality of magnetic sensors 208a, the system 214 may then determine the configuration of the magnets such as the magnets 104a-104h, proximate to the magnetic sensor mat 200. Based upon the determined configuration, the system 214 may determine the identity of the object 100, as well as the orientation and the position of the object 100 on the magnetic sensor mat 200. In embodiments, portions of this determination may be carried out in circuitry, such as the magnetic sensor hub 212 that may be part of the sensor pad 208.

In embodiments, the sensor pad 208 may be electrically powered. In non-limiting examples, this may be accomplished through a battery, a rechargeable battery, or a coupling to an electrical power source via, for example, an electrical plug in 210 that may plug into a wall socket. In embodiments, the sensor pad 208 may include a sensor pad hub 212 that may interact with an overlay key 206a. The overlay key 206a may be used to identify to the system 214, information about the design that may be on the layer of material 206, as well as the rules of one or more games or other interaction rules as the user interacts with the magnetic sensor mat 200 using object 100.

The sensor pad hub 212, may also serve as a connection port with the system 214. In embodiments, the sensor pad hub 212 may also include computer circuitry that may couple with and allow communication with other devices such as a game system (not shown) such as an Xbox™ or other gaming system. In embodiments, the sensor pad hub 212 may also provide direct connected, Wi-Fi and/or Bluetooth™ communication between sensor pad 208 and system 214, and/or other gaming components (not shown), and/or other input/output devices such as speakers or displays (not shown). The system 214 may be a computer such as a personal computer, a server, a tablet, a handheld device such as a smart phone, some general or specific computing platform, or any other similar device. In embodiments, the system 214 may be able to receive data from the sensor pad 208, process the received data, and provide feedback to a user regarding the placement of an object 100 upon the layer of material 206.

In embodiments, the combination of a sensor pad 208, system 214, and one or more objects 100 may be used to provide a number of different experiences for a user. In embodiments, the sensor pad 208 and accompanying overlay 206 may be used to implement an interactive board game with objects 100 being magnetic player tokens.

In other embodiments, an exercise tracking system may be implemented that uses magnetically identified weights. In embodiments, the system 214 may guide the user through an exercise routine. For example, the user may be given exercise instructions such as "next, do 12 plank rows." The user may respond by selecting an appropriate dumbbell set (not shown) and place it on the mat (layer of material 206). Through magnets placed proximate to the surface of the dumbbell, the system 214 may identify the weight set that have been selected. Further, if the exercise involves the selected weight set being in contact with the mat 206, the system 214 may also keep track of the number of repetitions of the exercise performed by the user. If exercise activity with the weights takes place in the air, such as doing curls, the mat 206 may use pressure sensors within the sensor pad 208 to determine the number of reps performed by the user.

In one non-limiting use example, the sensor pad 208 may be powered on. The system 214 may instruct the user to perform an action, for example to place a facet of an object 100 having a star upon a yellow square that may appear on overlay 206. The user may then grasp the object 100 and rotate the object 100 to a facet showing a star. The user may then place the star facet of the object 100 on the sensor surface. The system 214 may then validate the user selection via magnetic sensing using the sensing pad 208. Information from the sensors 208a may then be sent to the system 214 to determine whether the instructed action was completed successfully. The user may be given further instructions based on whether the instruction was successfully completed or not.

Another example implementation may include a doormat that identifies magnetic tokens associated with a person or an animal. Another example implementation may include a door mat that identifies magnetic token associated with a person or pet. Another example implementation may include smart board games that can recognize tokens and objects and track movements on the board game surface during play. Another example implementation may include a sensor pad 208 in a three dimensional implementation, such as a smart globe that may allow magnetic tokens to be placed on the globe.

Figure 3:
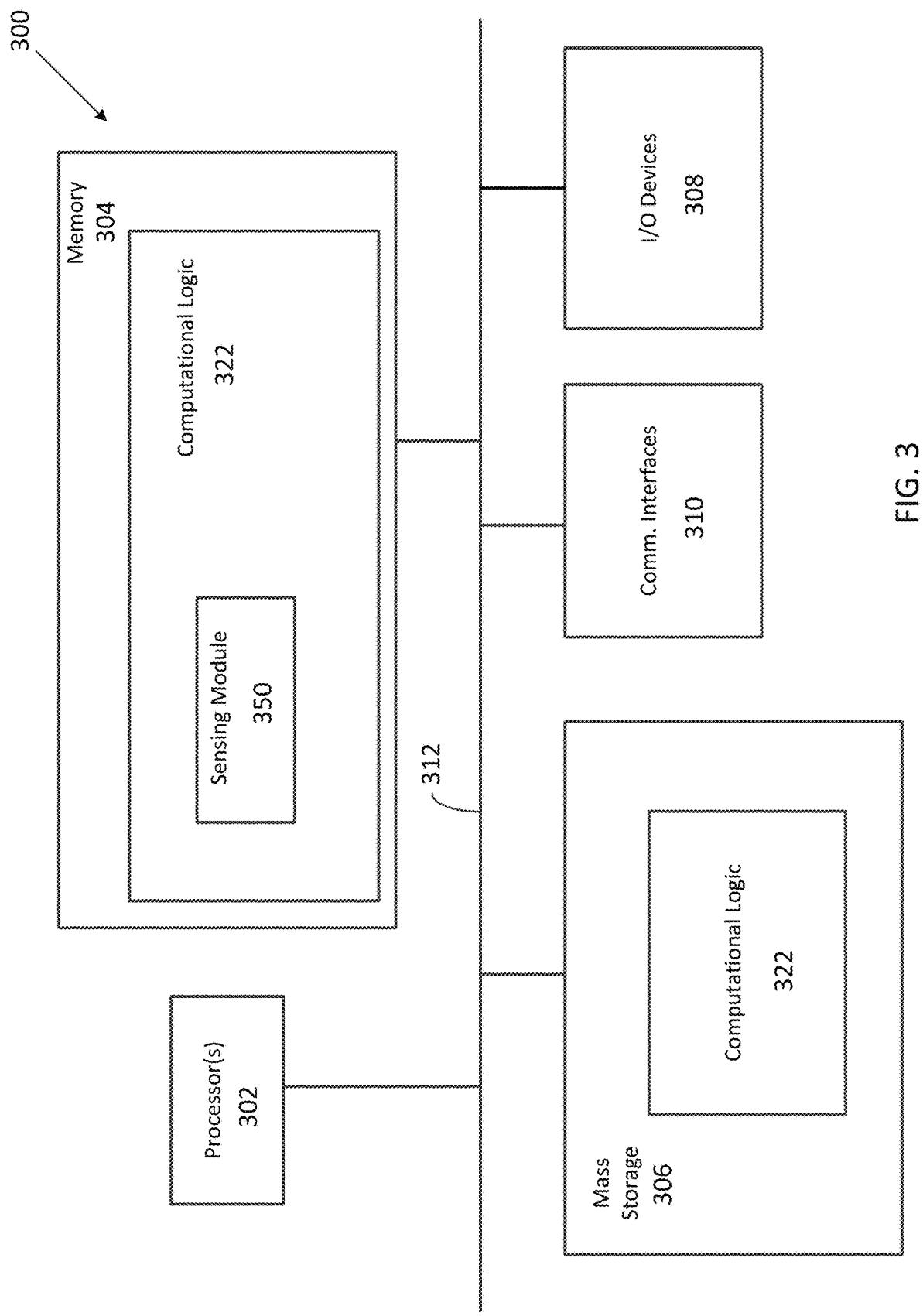
FIG. 3 illustrates an example computing device suitable for use to practice aspects of the present disclosure, in accordance with various embodiments.

FIG. 3 illustrates an example computing device 300 suitable for use to practice aspects of the present disclosure, in accordance with various embodiments. For example, the example computing device 300 may be suitable to implement the functionalities associated with diagrams 200, 400, and 500, system 214, and/or sensor pad hub 212.

As shown, computing device 300 may include one or more processors 302, each having one or more processor cores, and system memory 304. The processor 302 may include any type of unicore or multi-core processors. Each processor core may include a central processing unit (CPU), and one or more level of caches. The processor 302 may be implemented as an integrated circuit. In some embodiments, the computing device 300 may optionally include mass storage devices 306 (such as diskette, hard drive, volatile memory (e.g., dynamic random access memory (DRAM)), compact disc read only memory (CD-ROM), digital versatile disk (DVD) and so forth). In general, system memory through for and/or mass storage devices 306 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computing device 300 may further include input/output (I/O) devices 308 such as a display, keyboard, cursor control, remote control, gaming controller, image capture device, one or more three-dimensional cameras used to capture images, and so forth, and communication interfaces 310 (such as network interface cards, modems, infrared receivers, transceivers, radio receivers (e.g., Wi-Fi, Bluetooth), and so forth). I/O devices 308 may be suitable for communicative connections with magnetic pad 208 and/or magnetic sensors 208a. In some embodiments, I/O devices 308 may include other devices necessary for implementing the functionalities of determining the location and/or orientation of the object 100 in relation to the layer 206 as described in reference to FIGS. 1-2.

The communication interfaces 310 may include communication chips (not shown) that may be configured to operate the device 300 in accordance with a Global System for Mobile Communication (GSM), General Packet Radio Service (GPRS), Universal Mobile Telecommunications System (UMTS), High Speed Packet Access (HSPA), Evolved HSPA (E-HSPA), Long Term Evolution (LTE) network, or UWB radio-based communication. The communication chips may also be configured to operate in accordance with Enhanced Data for GSM Evolution (EDGE), GSM EDGE Radio Access Network (GERAN), Universal Terrestrial Radio Access Network (UTRAN), Evolved UTRAN (E-UTRAN), or or UWB radio-based communication. The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 310 may operate in accordance with other wireless protocols in other embodiments.

The above-described computing device 300 elements may be coupled to each other via system bus 312, which may represent one or more buses. In the case of multiple buses, they may be bridged by one or more bus bridges (not shown). Each of these elements may perform its conventional functions known in the art. In particular, system memory 304 and mass storage devices 306 may be employed to store a working copy and a permanent copy of the programming instructions implementing the operations and functionalities associated with the server 214 of diagram 200, generally shown as computational logic 322. Computational logic 322 may be implemented by assembler instructions supported by processor(s) 302 or high-level languages that may be compiled into such instructions.

In embodiments, the Computational Logic 322 may include one or more modules to perform one or more of the functions associated with diagrams 200, 400, 500, system 214 and/or sensor pad hub 212.

The permanent copy of the programming instructions may be placed into mass storage devices 306 in the factory, or in the field, though, for example, a distribution medium (not shown), such as a compact disc (CD), or through communication interfaces 310 (from a distribution server (not shown)).

Figure 4:
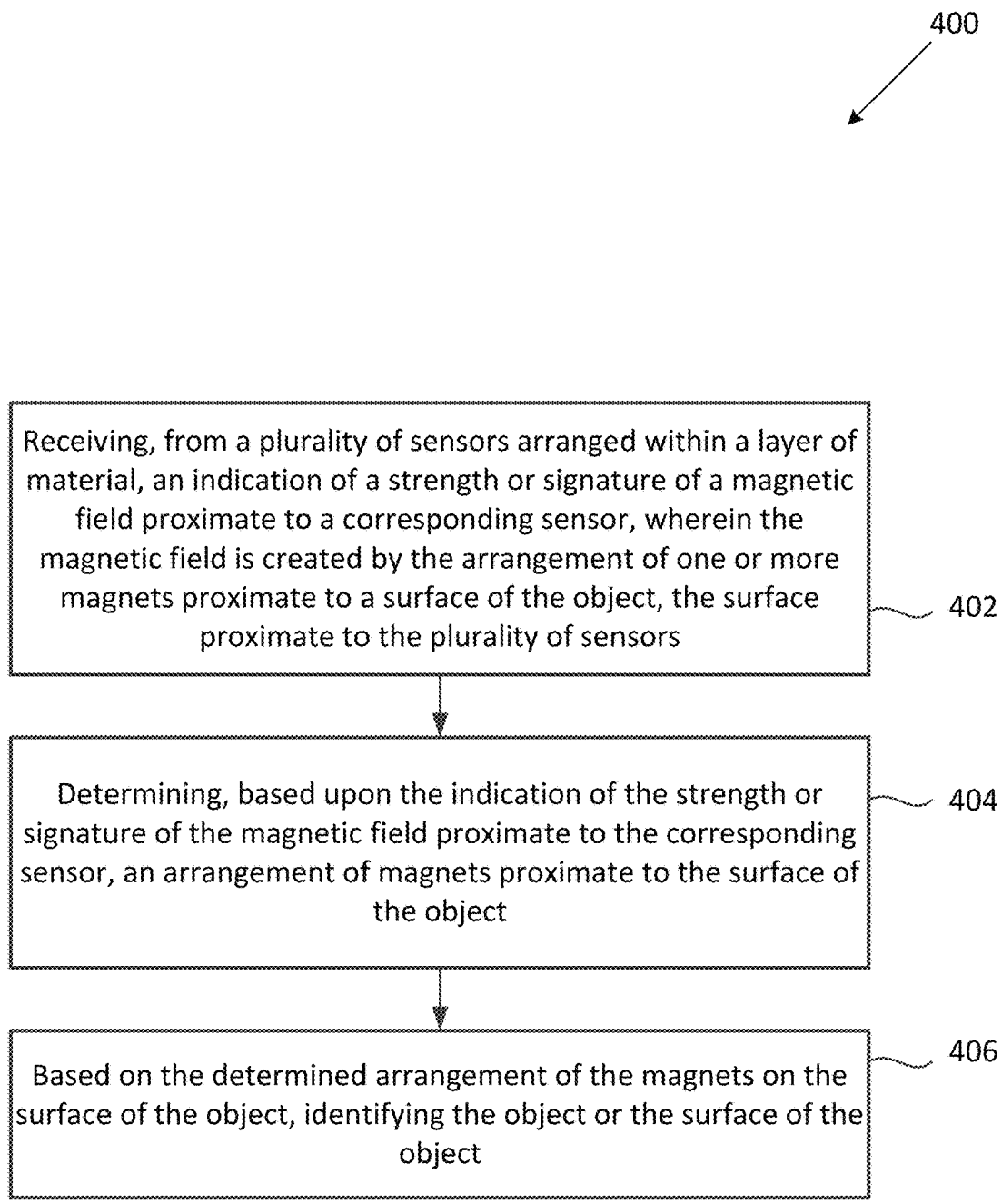
FIG. 4 is a block diagram illustrating a process for implementing a system for magnetic identification of an object on a sensing material, in accordance with some embodiments.

FIG. 4 is a block diagram illustrates a process for implementing a system for magnetic identification of an object on a sensing material, in accordance with some embodiments. In some embodiments, one or more processes of FIG. 400 may be implemented in the system 214. In some embodiments, one or more processes of FIG. 400 may be implemented in the sensor pad hub 212.

At block 402, the process may include receiving, from a plurality of sensors arranged within a layer of material, an indication of a strength or signature of a magnetic field proximate to a corresponding sensor, wherein the magnetic field is created by the arrangement of one or more magnets proximate to a surface of the object, the surface proximate to the plurality of sensors.

At block 404, the process may include determining, based upon the indication of the strength or signature of the magnetic field proximate to the corresponding sensor, an arrangement of magnets proximate to the surface of the object. In embodiments, the array of sensors 208a may be sufficiently dense such that a magnet 104 near the surface of an object 100 may be detected by at least one sensor. In embodiments, by knowing the position of the affected sensors 208a, the pattern of the magnets may be determined. In embodiments, this determined pattern may be used to identify the object 100.

At block 406 the process may include, based on the determined arrangement of the magnets on the surface of the object, identifying the object or the surface of the object.

Figure 5:
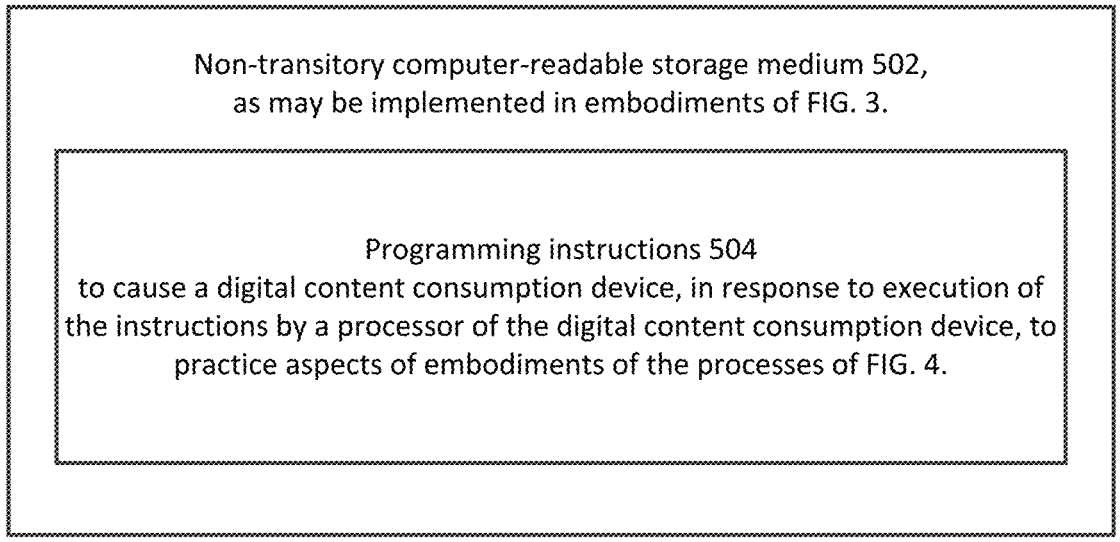
FIG. 5 is a diagram illustrating computer readable media having instructions for practicing magnetic identification of an object on a sensing material, in accordance with some embodiments.

FIG. 5 is a diagram illustrating computer readable media having instructions for practicing magnetic identification of an object on a sensing material, in accordance with some embodiments. In some embodiments, such computer readable media 502 may be included in a memory or storage device, which may be transitory or non-transitory, of the system 214 or the sensor pad hub 212 of FIG. 2. In embodiments, instructions 504 may include assembler instructions supported by a processing device, or may include instructions in a high-level language, such as C, that can be compiled into object code executable by the processing device. In some embodiments, a persistent copy of the computer readable instructions 504 may be placed into a persistent storage device in the factory or in the field (through, for example, a machine-accessible distribution medium (not shown)). In some embodiments, a persistent copy of the computer readable instructions 1004 may be placed into a persistent storage device through a suitable communication pathway (e.g., from a distribution server).

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

EXAMPLES

Examples, according to various embodiments, may include the following.

Example 1 may be an apparatus with object identification, comprising: a layer of material; a plurality of sensors arranged within the layer of material to indicate respectively a strength or signature of a magnetic field proximate to the corresponding sensor; and wherein the magnetic field proximate to each sensor is generated by one or more magnets proximate to a surface of an object proximate to the layer of material, the one or more magnets arranged to provide a signature to identify the object or the surface of the object; wherein the relative strength or signature of the magnetic field indicated identifies a location of the object in relation to the layer of material.

Example 2 may include the apparatus of example 1, wherein the surface of the object and the layer of material are substantially flat.

Example 3 may include the apparatus of any examples 1-2, wherein the layer of material is a rug or a play mat.

Example 4 may include the apparatus of any examples 1-2, wherein the layer of material comprises markings to indicate placements of the object or the surface of the object onto the layer of material.

Example 5 may include the apparatus of any examples 1-2, wherein the one or more magnets are neodymium magnets and the sensors are to sense a magnetic field generated by the one or more neodymium magnets.

Example 6 may include the apparatus of any examples 1-2, further comprising a processing device coupled to the plurality of sensors within the layer of material to: receive, from the plurality of sensors, an indication of a strength of the magnetic field proximate to each sensor; determine, based upon the indication of the strength of the magnetic field proximate to each sensor the arrangement of the one or more magnets proximate to the surface of the object; and based on the arrangement of the magnets proximate to the surface of the object, identify the object or the surface of the object.

Example 7 may include the apparatus of example 6, wherein the processing device is further to output the identified object or the identified surface of the object.

Example 8 may include the apparatus of example 6, wherein the processing device is further to, based on the arrangement of the magnets proximate to the surface of the object and the indicated strength of the magnetic field proximate to each sensor, identify the location of the object in relation to the layer of material.

Example 9 may include the apparatus of example 8, wherein the processing device is further to output the identified location of the object in relation to the layer of material.

Example 10 may include the apparatus of any examples 1-2, wherein the layer of material is flexible.

Example 11 may include the apparatus of any examples 1-2, wherein to identify the surface of the object further includes to identify an orientation of the object in relation to the layer of material.

Example 12 may be an apparatus equipped for identification, comprising: an object having a surface; one or more magnets embedded in the object proximate to the surface, and arranged in a particular manner, wherein a magnetic field resulting from the arrangement of the one or more magnets is to identify the object or the surface of the object.

Example 13 may include the apparatus of example 12, wherein the surface of the object rests on a layer of material.

Example 14 may include the apparatus of example 12, wherein the object has multiple surfaces.

Example 15 may include the apparatus of example 12, wherein the surface is substantially flat.

Example 16 may include the apparatus of example 12, wherein the one or more magnets are neodymium magnets.

Example 17 may include the apparatus of example 12, wherein the object is a regular convex polyhedron.

Example 18 may include the apparatus of example 12, wherein the object is a die.

Example 19 may include the apparatus of any examples 12-18, wherein identify the object, or the surface of the object, is to determine an outcome in a game.

Example 20 may include a system for identifying an object, comprising: one or more computer processors; memory coupled to the one or more computer processors; and an identification module, to be loaded onto the memory and executed by the one or more processors, to identify an object or a surface of the object in relation to a plurality of sensors within a layer of material, wherein one or more magnets are proximate to the surface of the object and arranged to create a magnetic field to be detected by the plurality of sensors when the surface of the object is proximate to the layer of material; and wherein the identification module is to: receive, from the plurality of sensors, an indication of a strength or signature of the magnetic field proximate to each sensor; determine, based upon the indication of the signature of the magnetic field the arrangement of magnets proximate to the surface of the object; and based on the determined arrangement of the magnets proximate to the surface of the object, identify the object or the surface of the object.

Example 21 may include the system of example 20, wherein the identification module is further to determine, based on the indication of a strength or signature of the magnetic field proximate to the plurality of sensors within the layer of material, a location of the object relative to the layer of material.

Example 22 may include a method for identifying an object, comprising: receiving, from a plurality of sensors arranged within a layer of material, an indication of a strength or signature of a magnetic field proximate to the corresponding sensor, wherein the magnetic field is created by the arrangement of one or more magnets proximate to a surface of the object, the surface proximate to the plurality of sensors; determining, based upon the indication of the strength or signature of the magnetic field proximate to the corresponding sensor, an arrangement of magnets proximate to the surface of the object; and based on the determined arrangement of the magnets on the surface of the object, identifying the object or the surface of the object.

Example 23 may include the method of example 22, further comprising outputting an indication of the identified object or the identified surface of the object.

Example 24 may include the method of example 22, further comprising based on the arrangement of the magnets proximate to the surface of the object and the indicated strength of the magnetic field proximate to each sensor, identifying the location of the object in relation to the layer of material.

Example 25 may include the method of example 24, further comprising outputting an indication of the location of the object in relation to the layer of material.

Example 26 may include the method of any examples 22-25, wherein the one or more magnets are neodymium magnets and the sensors are to sense a magnetic field generated by the one or more neodymium magnets.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus with object identification, comprising:
    a layer of material;
    a plurality of sensors arranged within the layer of material to indicate respectively a strength or signature of a magnetic field proximate to the corresponding sensor;
    an overlay key electrically coupled with the layer of material to identify, to a computing system, interaction rules for a user placing an object proximate to the layer of material;
    wherein the magnetic field proximate to each sensor is generated by one or more magnets proximate to a surface of the object proximate to the layer of material, the one or more magnets arranged to provide a signature to identify the object or the surface of the object; and
    wherein the relative strength or signature of the magnetic field indicated identifies a location of the object in relation to the layer of material.

2. The apparatus of claim 1, wherein the surface of the object and the layer of material are substantially flat.

3. The apparatus of claim 1, wherein the layer of material is a rug or a play mat.

4. The apparatus of claim 1, wherein the layer of material comprises markings to indicate placements of the object or the surface of the object onto the layer of material.

5. The apparatus of claim 1, wherein the one or more magnets are neodymium magnets and the sensors are to sense a magnetic field generated by the one or more neodymium magnets.

6. The apparatus of claim 1, further comprising a processing device coupled to the plurality of sensors within the layer of material to:
    receive, from the plurality of sensors, an indication of a strength of the magnetic field proximate to each sensor;
    determine, based upon the indication of the strength of the magnetic field proximate to each sensor, the arrangement of the one or more magnets proximate to the surface of the object; and
    based on the arrangement of the magnets proximate to the surface of the object, identify the object or the surface of the object.

7. The apparatus of claim 6, wherein the processing device is further to output the identified object or the identified surface of the object.

8. The apparatus of claim 6, wherein the processing device is further to, based on the arrangement of the magnets proximate to the surface of the object and the indicated strength of the magnetic field proximate to each sensor, identify the location of the object in relation to the layer of material.

9. The apparatus of claim 8, wherein the processing device is further to output the identified location of the object in relation to the layer of material.

10. The apparatus of any claim 1, wherein the layer of material is flexible.

11. The apparatus of claim 1, wherein to identify the surface of the object further includes to identify an orientation of the object in relation to the layer of material.

12. An apparatus equipped for identification, comprising:
an object having one or more surfaces;
a magnet embedded in the object proximate to a first surface of the one or more surfaces and a second surface of the one or more surfaces adjacent to the first surface, and arranged in a particular manner, wherein a magnetic field resulting from the arrangement of the magnet is to identify the object or at least one of the one or more surfaces of the object.

13. The apparatus of claim 12, wherein a surface of the object rests on a layer of material.

14. The apparatus of claim 12, wherein the object includes a graphical design on at least one of the one or more surfaces.

15. The apparatus of claim 12, wherein the one or more surfaces is substantially flat.

16. The apparatus of claim 12, wherein the magnet is a neodymium magnet.

17. The apparatus of claim 12, wherein the object is a regular convex polyhedron.

18. The apparatus of claim 12, wherein to identify the object, or a surface of the object, is to determine an outcome in a game.

19. A system for identifying an object, comprising:
one or more computer processors;
memory coupled to the one or more computer processors; and
an identification module, to be loaded onto the memory and executed by the one or more processors, to identify an object or a surface of the object in relation to a plurality of sensors within a layer of material, wherein one or more magnets are proximate to the surface of the object and arranged to create a magnetic field to be detected by the plurality of sensors when the surface of the object is proximate to the layer of material;
an overlay key electrically coupled with the layer of material to identify, to a computing system, interaction rules for a user placing the object proximate to the layer of material; and
wherein the identification module is to:
receive, from the plurality of sensors, an indication of a strength or signature of the magnetic field proximate to each sensor;
determine, based upon the indication of the signature of the magnetic field, the arrangement of magnets proximate to the surface of the object; and
based on the determined arrangement of the magnets proximate to the surface of the object, identify the object or the surface of the object.

20. The system of claim 19, wherein the identification module is further to determine, based on the indication of a strength or signature of the magnetic field proximate to the plurality of sensors within the layer of material, a location of the object relative to the layer of material.

21. A method for identifying an object, comprising:
receiving, from a plurality of sensors arranged within a layer of material, an indication of a strength or signature of a magnetic field proximate to the corresponding sensor, wherein the magnetic field is created by the arrangement of one or more magnets proximate to a first surface of one or more surfaces of the object and a second surface of the one or more surfaces of the object adjacent to the first surface of the object, the first surface or the second surface proximate to the plurality of sensors;
determining, based upon the indication of the strength or signature of the magnetic field proximate to the corresponding sensor, an arrangement of magnets proximate to the first surface or the second surface of the object; and
based on the determined arrangement of the magnets on the first surface or the second surface of the object, identifying the object or the first surface or the second surface of the object, wherein the object or the first surface or the second surface of the object is to identify a person or an animal.

22. The method of claim 21, further comprising outputting an indication of the identified object or the identified first surface or the second surface of the object.

23. The method of claim 21, further comprising based on the arrangement of the magnets proximate to the first surface or the second surface of the object and the indicated strength of the magnetic field proximate to each sensor, identifying a location of the object in relation to the layer of material.

24. The method of claim 23, further comprising outputting an indication of the location of the object in relation to the layer of material.

25. The method of claim 21, wherein the one or more magnets are neodymium magnets and the sensors are to sense a magnetic field generated by the one or more neodymium magnets.

* * * * *